(12) United States Patent
Muramatsu

(10) Patent No.: US 6,937,141 B2
(45) Date of Patent: Aug. 30, 2005

(54) CAR CONTROL SYSTEM AND VEHICLE REMOTE CONTROL SYSTEM

(75) Inventor: Toshihiko Muramatsu, Toyooka-mura (JP)

(73) Assignee: Yamaha Corporation, Hamamatsu (JP)

( * ) Notice: Subject to any disclaimer, the term of this patent is extended or adjusted under 35 U.S.C. 154(b) by 43 days.

(21) Appl. No.: 10/411,614

(22) Filed: Apr. 10, 2003

(65) Prior Publication Data

US 2003/0193390 A1 Oct. 16, 2003

(30) Foreign Application Priority Data

Apr. 11, 2002 (JP) ..................................... P2002-109474

(51) Int. Cl.⁷ ............................................. B60R 25/10
(52) U.S. Cl. ............................. 340/426.13; 340/426.2
(58) Field of Search ....................... 340/426.25, 426.23, 340/426.2, 426.13

(56) References Cited

U.S. PATENT DOCUMENTS 5,027,104 A * 6/1991 Reid ........................... 340/541

2002/0130769 A1 * 9/2002 Yamagishi ................... 340/426

OTHER PUBLICATIONS

U.S. Appl. No. 10/373,823, filed Feb. 25, 2003, Muramatsu.

* cited by examiner

*Primary Examiner*—Jeffery Hofsass
*Assistant Examiner*—Jennifer Stone
(74) *Attorney, Agent, or Firm*—Pillsbury Winthrop Pittman LLP

(57) ABSTRACT

Sensor data of respective controlled objects of a vehicle are collected by calling a vehicle remote-control system provided to the vehicle via a mobile phone, and then these data are displayed on an LCD display panel 11c of the mobile phone. In this state, the controlled object to be remotely controlled is selected by operating a cursor (30) and an ON/OFF setting button (31), and then its ON or OFF state is set. At this time, the remote-control command data are transmitted to the vehicle remote-control system from the mobile phone to set the corresponding controlled object. The condition is transmitted once again to the mobile phone as the sensor data, and is displayed on the LCD display panel (11c).

7 Claims, 18 Drawing Sheets

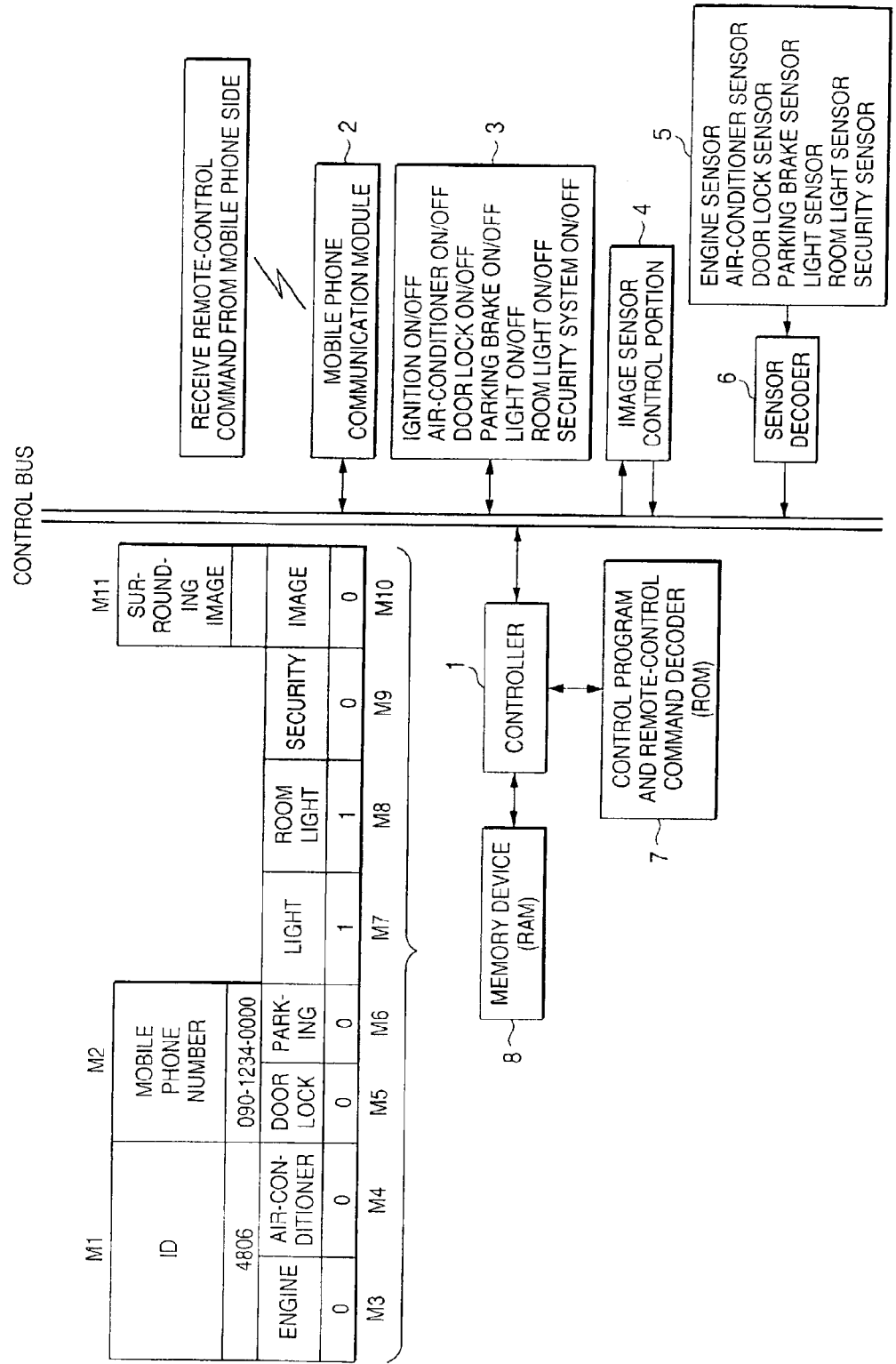

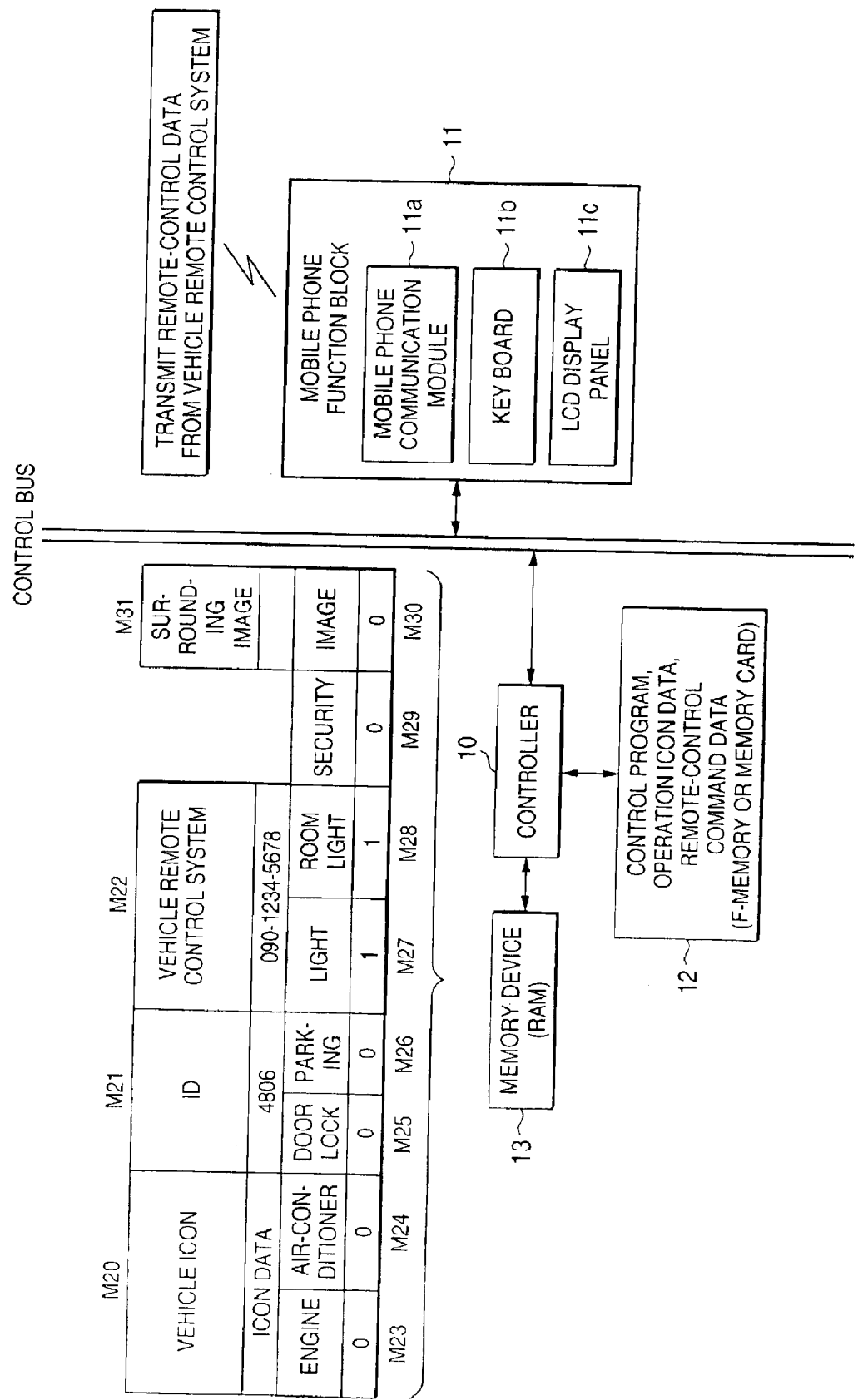

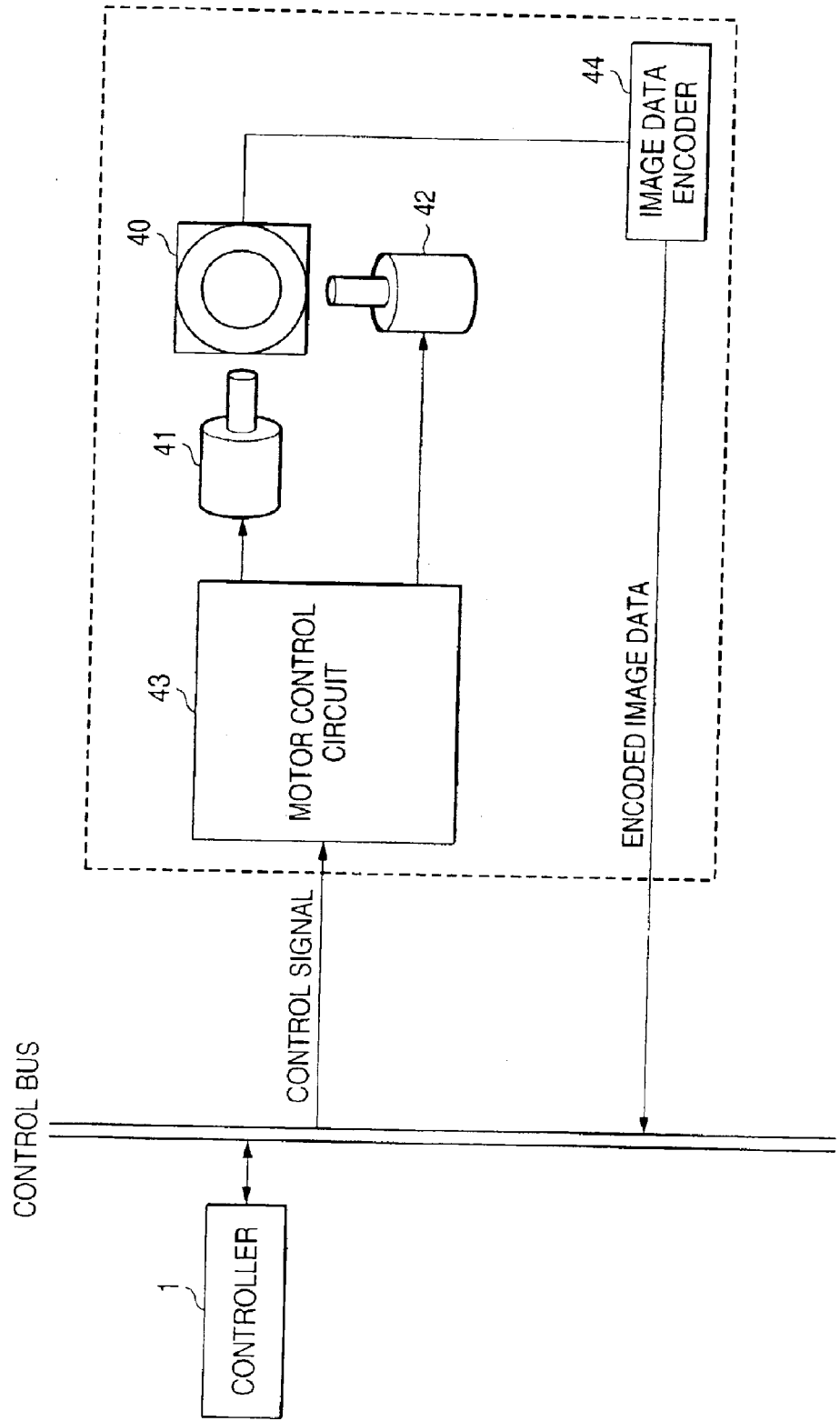

FIG. 4

| REMOTE CONTROL COMMAND | COMMAND CODE | COMMAND CONTENT |
|---|---|---|
| ENGINE ON/OFF | "0001" | "0" |
| AIR-CONDITIONER ON/OFF | "0010" | "0" |
| DOOR LOCK ON/OFF | "0011" | "1" |
| PARKING BRAKE ON/OFF | "0100" | "1" |
| LIGHT ON/OFF | "0101" | "0" |
| ROOM LIGHT ON/OFF | "0110" | "0" |
| SECURITY SYSTEM ON/OFF | "0111" | "1" |
| IMAGE SENSOR ON/OFF | "1000" | "0" |
| IMAGE SENSOR UPWARD MOVEMENT | "1001" | "0" |
| IMAGE SENSOR DOWNWARD MOVEMENT | "1010" | "0" |
| IMAGE SENSOR RIGHTWARD MOVEMENT | "1011" | "0" |
| IMAGE SENSOR LEFTWARD MOVEMENT | "1100" | "0" |
| IMAGE MEMORY ON/OFF | "1101" | "0" | ns
CAR CONTROL SYSTEM AND VEHICLE REMOTE CONTROL SYSTEM

BACKGROUND OF THE INVENTION

The present invention relates to a vehicle control system and a vehicle remote control system capable of controlling predetermined operation portions, which execute door lock ON/OFF, parking brake ON/OFF, engine ON/OFF, etc., by the remote operation instructed by a mobile phone via a communication module equipped to the vehicle side.

From viewpoints of improvement in drivability and theft prevention, various sensors are installed on doors, a brake, a room light, an engine, etc. of the vehicle. The system for displaying condition of these sensors on a meter panel or for informing the contracted security company of the vehicle location at the time of burglary is put into practical use. In this manner, the drivability can be improved by displaying signals of various sensors on the meter panel, or an emergency measure against the vehicle theft can be taken by linking the sensor information to the system of the security company via the radio.

However, unless the driver sits on the driver's seat, the sensor information is merely displayed on the meter panel, there is no effect for the condition check, and the drivability is limited. In the system that needs a separate contract with a security company to prevent the theft, not only a special device for that purpose must be equipped to an inside of the vehicle but also merely the condition of the vehicle at the time of occurrence of the theft can be understood, and thus it is impossible to know the condition of the vehicle at any time.

As the system capable of controlling remotely controlled objects in the vehicle from the outside, there is the keyless entry system. According to this system, it is within point-blank range away from the vehicle by about several meters that the remote control can be executed limitedly. Thus, it is impossible to operate such system at a remote place.

SUMMARY OF THE INVENTION

It is an object of the present invention to provide a vehicle control system and a vehicle remote control system that are capable of grasping and remotely controlling the condition of the vehicle at any time at a remote place by linking sensor portions and a control portion in a vehicle to a mobile phone.

In order to solve the aforesaid object, the invention is characterized by having the following arrangement.

(1) A vehicle control system comprising:
a communication module which communicates with a mobile phone in response to a call issued from the mobile phone;
an operation control portion which controls a predetermined operation portion of a vehicle;
a sensor portion which detects information concerning condition of the operation portion; and
a controller which transmits the information through the communication module to the mobile phone when the controller receives the call from the mobile phone and ID of the mobile phone is authenticated,
wherein when the controller receives command from the mobile phone, the controller instructs the operation control potion to execute a control corresponding to the command, and transmits, to the mobile phone, the information concerning condition of the operation portion, which is controlled by the operation control portion according to the command, detected by the sensor portion.

(2) The vehicle control system according to (1), wherein the predetermined operation portion includes an image sensor for capturing a peripheral image of the vehicle, and the controller instructs the image sensor to capture the peripheral image of the vehicle and transmits the captured peripheral image based on the command from the mobile phone.

(3) The vehicle control system according to (2) further comprising a vehicle navigation system which measures position of the vehicle and displays information concerning the position of the vehicle and peripheral road information,
wherein the controller transmits, to the mobile phone, the information concerning the position of the vehicle measured by the vehicle navigation system and the peripheral image captured by the image sensor.

(4) The vehicle control system according to (1), wherein the predetermined operation portion includes an image sensor for capturing a peripheral image of the vehicle and a security sensor for detecting an abnormal state of the vehicle, and
the controller automatically transmits, to the mobile phone, the information representing the detected abnormal state and the peripheral image captured by the image sensor when the security sensor detects the abnormal state of the vehicle.

(5) The vehicle control system according to (1), wherein the operation portion includes at least one of engine, air conditioner, door lock, parking brake, light, interior light, image sensor and security sensor.

(6) A remote-control system for vehicle including a vehicle control system and a mobile phone, the vehicle remote control system comprising:
the vehicle control system including:
a communication module which communicates with the mobile phone in response to a cal issued from the mobile phone,
a operation control portion which controls a predetermined operation portion of the vehicle,
a sensor portion which detects information concerning condition of the operation portion, and
a controller which transmits the information through the communication module to the mobile phone when the controller receives the call from the mobile phone and ID of the mobile phone is authenticated, wherein when the controller receives command from the mobile phone, the controller instructs the operation control potion to execute a control corresponding to the command, and transmits, to the mobile phone, the information concerning condition of the operation portion, which is controlled by the operation control portion according to the command, detected by the sensor portion; and
the mobile phone including:
a input portion which inputs the command to control the predetermined operation portion of the vehicle, and
a display portion which displays the information concerning the condition of the operation portion which is controlled by the operation control portion according to the command, which received from the vehicle control system.

(7) A vehicle control system comprising:
a communication module which communicates with a mobile phone in response to a call issued from the mobile phone;
a sensor portion which is installed on a vehicle detects information concerning vehicle condition; and a controller which transmits the information detected by the sensor portion through the communication module to the mobile phone when the controller receives the call from the mobile phone and ID of the mobile phone is authenticated.

(8) The vehicle control system according to (7), wherein the sensor portion includes the predetermined operation portion includes a security sensor for detecting an abnormal state of the vehicle, and the controller transmits, to the mobile phone, the information representing the detected abnormal state when the security sensor detects the abnormal state of the vehicle.

(9) The vehicle control system according to (7), wherein the sensor portion detects the condition of at least one of engine, air conditioner, door lock, parking brake, light, interior light, image sensor, security sensor, gasoline and battery.

(10) A method of controlling a vehicle control system which includes a communication module for communicating with a mobile phone, an operation control portion for controlling a predetermined operation portion of a vehicle, a sensor portion for detecting information concerning condition of the operation portion and a controller for transmitting the information through the communication module, the method comprising the steps of:

communicating with the mobile phone when the communication module receives a call issued from the mobile phone;

transmitting the information by the controller through the communication module to the mobile phone when ID of the mobile phone is authenticated; and instructing, when the controller receives command from the mobile phone, the operation control portion to execute a control corresponding to the command, and transmitting, to the mobile phone, the information concerning condition of the operation portion, which is controlled by the operation control portion according to the command, detected by the sensor portion.

(11) A method of controlling a vehicle control system comprising:

establishing communication between a vehicle and a mobile phone in response to a call issued from the mobile phone; and transmitting information concerning vehicle condition to the mobile phone when ID of the mobile phone is authenticated.

BRIEF DESCRIPTION OF THE DRAWINGS

FIG. 1 is a configurative view of a vehicle remote-control system as a first embodiment of the present invention.

FIG. 2 is a configurative view of a mobile phone.

FIG. 3 is a configurative view of an image sensor control portion.

FIG. 4 is a view showing a correlation table between remote control commands and command codes.

DETAILED DESCRIPTION OF PREFERRED EMBODIMENTS

Figure 5:
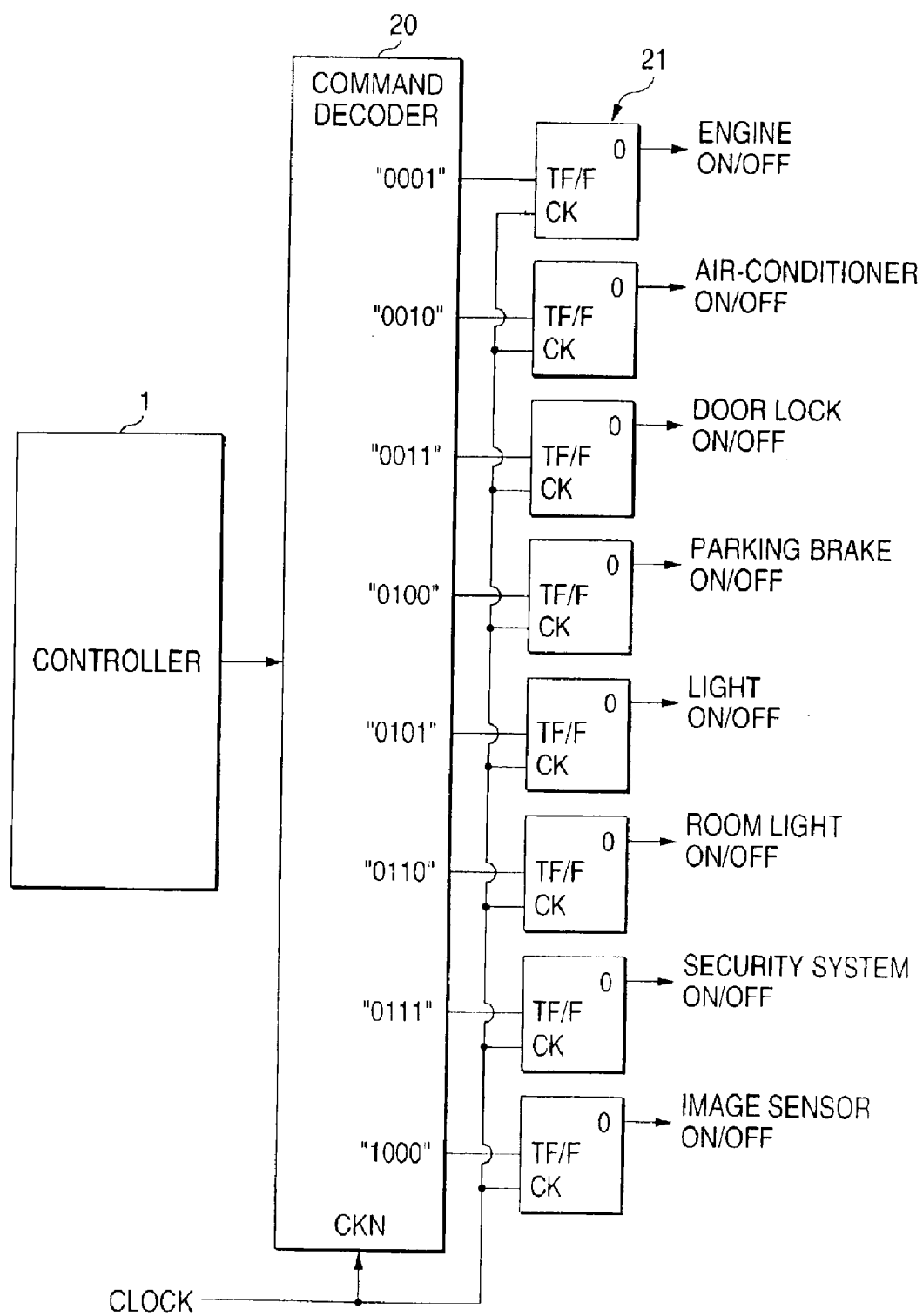
FIG. 5 is a configurative view of a hardware of a remote-control command decoder.

A vehicle remote control system according to an embodiment of the present invention will be explained in detail hereinafter.

FIG. 1 is a configurative view of a remote-control system on the vehicle side (hereinafter refer to vehicle remote-control system).

To a controller 1 are connected a mobile phone communication module 2 for communicating with a mobile phone in response to the call issued from the mobile phone; a remote-control portion 3 for controlling predetermined operation portions of the vehicle such as an air conditioner, door locks, a parking brake, a light, etc. as controlled objects; an image sensor control portion 4 for picking up an image around the vehicle; and a sensor portion 5 for sensing conditions of various controlled objects of the vehicle such as an air-conditioner sensor, door lock sensors, a parking brake sensor, etc. The remote-control portion 3 and the image sensor control portion 4 correspond to a control portion in the present invention. In this case, a signal being sensed by the sensor portion 5 is decoded by a sensor decoder 6 and then input into the controller 1. A control program and a decode program, which decodes remote control commands being supplied from the mobile phone side, are stored in a ROM 7 that is connected to the controller 1. An ID used to execute ID authentication of the mobile phone, a mobile phone number, sensor data, surrounding image, etc. are stored in a RAM 8. More particularly, ID (in the embodiment, ID=4806) is stored in an area M1, the mobile phone number is stored in an area M2, data from engine, air-conditioner, door lock, parking brake, light, room light, security, and image sensors are stored in areas M3 to M10 respectively, and a surrounding image picked up by the image sensor control portion 4 is stored in an area M11. In this case, "1" of the sensor data stored in M3 to M10 indicates ON and "0" indicates OFF. The security sensor in the sensor portion 5 is constructed by a sensor that senses whether or not the inserted electronic key, for example, can be authenticated.

When the mobile phone communication module 2 senses the call issued from the mobile phone, the controller 1 decides whether or not the subsequent ID coincides with the ID stored in M1. Then, if they coincide with each other, the controller 1 executes the control in response to the remote control command being transmitted subsequently from the mobile phone. As described later, the controller 1 transmits the sensor data stored in M3 to M10 to the mobile phone, receives the remote-control command issued from the mobile phone, and outputs a control signal to the remote-control portion 3. After the control made by the remote-control portion 3 is ended, the controller 1 updates the sensor data stored in M3 to M10 to reflect the ON/OFF control and then transmits the updated sensor data to the mobile phone. The sensor data are displayed on the LCD display panel 11c.

FIG. 2 is a configurative view of the mobile phone.

In this mobile phone, a mobile phone function block 11, an F-memory (or memory card) 12 and a RAM 13 are connected to a controller 10. The mobile phone function block 11 includes a mobile phone communication module 11a, a keyboard 11b and an LCD display panel 11c. The mobile phone function block 11 has a function that executes the data communication between the mobile phone communication module 2 and this block by phone-calling the vehicle remote-control system in FIG. 1, in addition to the function as the normal mobile phone. The key board 11b is used to input the phone number and the commands, and the LCD display panel 11c is used to display various messages and respective sensor data from the sensor portion 5 in FIG. 1.

A stored control program, operation icon data, remote control command data, etc. are stored in the flash memory 12. In RAM 13, the data transmitted from the area M3 to the area M11 in FIG. 1 are stored in an area M23 to an area M31, icon data of the vehicle are stored in an area M20, the ID is stored in an area M21, and the phone number of the vehicle remote-control system is stored in an area M22.

When the remote control is executed by calling the vehicle remote-control system, at first the ID is input via the key board 11b. Then, when the ID authentication is executed on the vehicle remote-control system side, the sensor data stored in M3 to M10 in the vehicle remote-control system are transmitted to M23 to M30 in the mobile phone. At this time, the icon data as well as ON/OFF conditions of respective sensors are displayed on the LCD display panel 11c. The operator sets ON/OFFs of the controlled objects such as air conditioner, door lock, etc. according to this display, then converts these settings into the command data as the remote control command, and then transmits the data to the vehicle remote-control system side. When the vehicle remote-control system receives the command data, such system drives the remote-control portion 3 in response to such data to execute ON/OFF-control of the predetermined controlled object. The sensor data stored in M3 to M10 are updated at this time. The updated sensor data are transmitted once again to the mobile phone. Such sensor data are displayed on the LCD display panel 11c.

Therefore, when the owner of the mobile phone executes a predetermined operation applied to the controlled object of the vehicle on the LCD display panel 11c, the remote control is executed based on this operation. Then, the result of the remote control is displayed on the LCD display panel 11c.

Accordingly, the remote control of respective controlled objects in the vehicle remote-control system can be executed from the mobile phone side. In this case, when the image sensor is set to ON, the surrounding image round the vehicle, which is picked up by the image sensor control portion 4, is stored in M11 of the vehicle remote-control system. Then, this surrounding image is transmitted to M31 in the mobile phone. This surrounding image is displayed on the LCD display panel 11c.

FIG. 3 is a configurative view of the image sensor control portion 4. An image sensor 40 is installed on an appropriate position in the vehicle, and can pick up the image round the vehicle via the vehicle window. This image sensor 40 can be rotated/driven by a vertical-direction drive motor 41 in the vertical direction and also can be rotated/driven by a horizontal-direction drive motor 41 in the horizontal direction. The imaging direction of the image sensor 40 can be set in any direction by controlling two motors 41, 42. A motor control circuit 43 controls the motors 41, 42. The image data picked up by the image sensor 40 is encoded (compressed) by an image data encoder 44, and then transferred to the controller 1. In this case, if the image sensor 40 is constructed to sense the moving picture, the image data is encoded by the compression technology such as MPEG2, etc., for example. If the image picked up by the image sensor 40 is the still picture, such image is encoded into JPEG image, or the like.

FIG. 4 shows correlations between the remote control commands and the command codes. In an example shown in FIG. 4, the command code consists of 4 bits, and 1 bit is used to turn ON/OFF and to drive the image sensor by a predetermined angle in upward/downward/leftward/rightward directions. Therefore, when the command is transmitted to the vehicle remote-control system side from the mobile phone, the command code (4 bits)+the command content (1 bit) are transmitted.

The command code and the command content are decoded by a remote-control command decoder in the ROM 7 and converted into a predetermined signal, and then transferred to the remote-control portion 3. In this case, this remote-control command decoder can be constructed by a hardware. FIG. 5 shows an example of the remote-control command decoder when such command decoder is formed of the hardware.

More particularly, the command code transferred from the controller 1 is decoded by a command decoder 20. The decoded output is input into a T-type flip-flop 21 to form each control signal. This control signal and the 1-bit command content are output to the remote-control portion 3. Then, the remote-control portion 3 controls the corresponding controlled object based on the data. For example, if the remote-control command code is "0001" and the command content is "1", the engine is turned ON. If the command content is "0", the engine is turned OFF.

Figure 6:
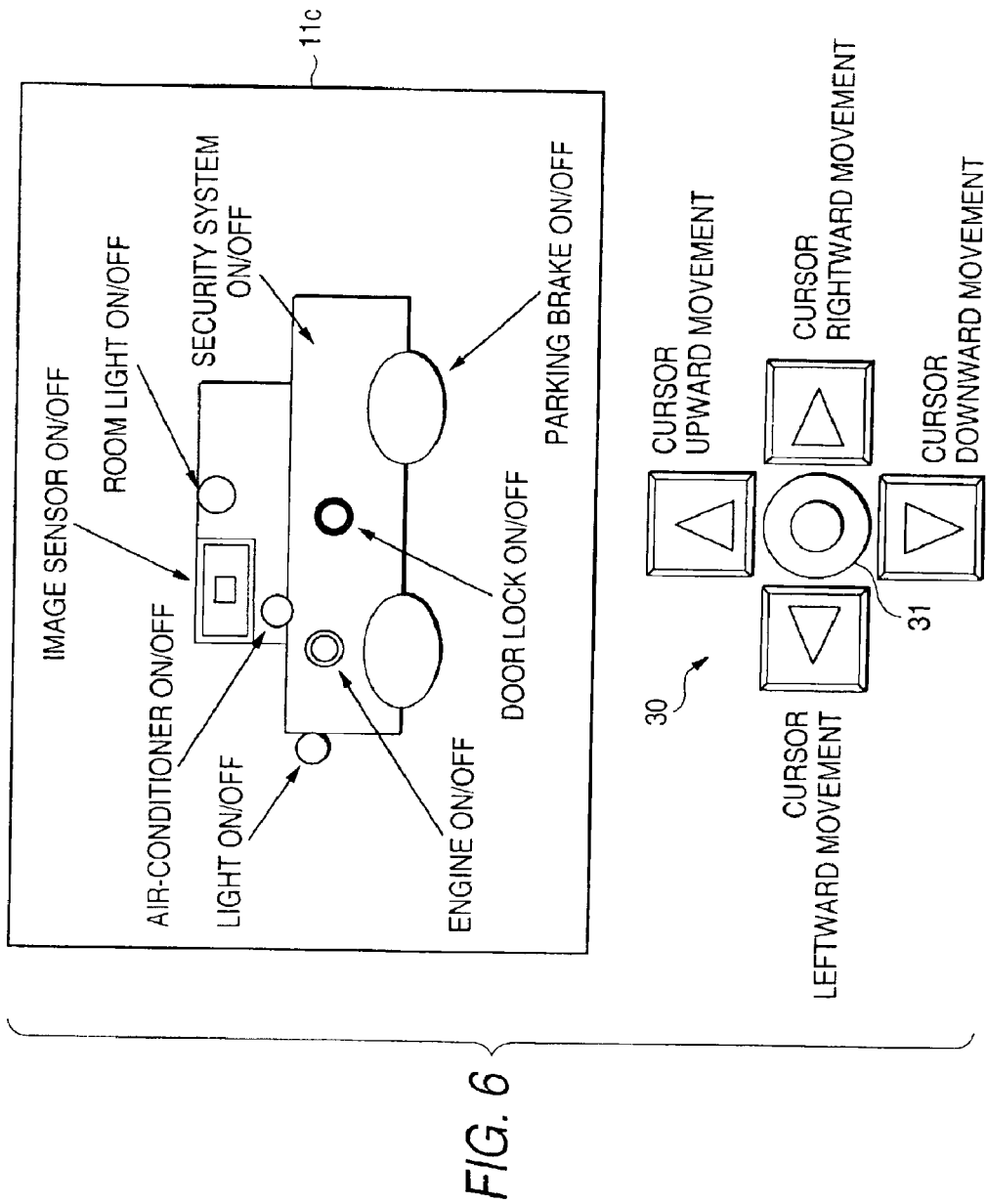
FIG. 6 is a view showing an example of display in the mobile phone.

FIG. 6 shows displayed states and a part of the keyboard on the LCD display panel 11c of the mobile phone. FIG. 6 is an example of display when respective controlled objects of the vehicle are to be remotely controlled from the mobile phone side.

A vehicle icon stored in M20 and various sensor positions positioned on this icon respectively are displayed on the LCD display panel 11c. The sensor positions that are to be selected on the screen can be changed by operating cursor keys 30 on the key board 11b. The ON/OFF-state of the selected sensor position can be decided by operating an ON/OFF set button 31. This ON/OFF set button 31 executes a toggle operation, and switches ON/OFF of the selected sensor alternatively in answer to the operation of the button.

Figure 7:
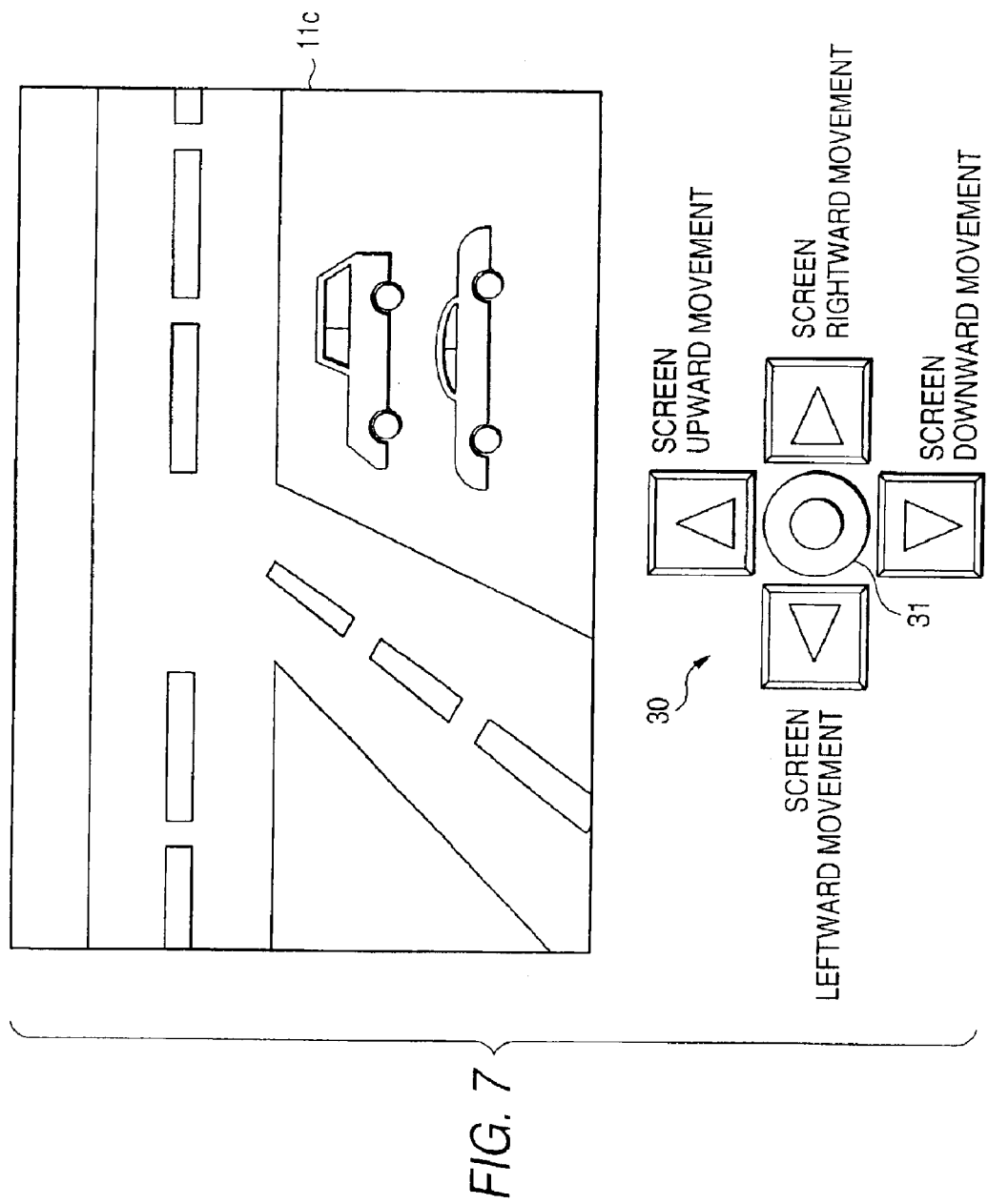
FIG. 7 is a view showing another example of display in the mobile phone.

FIG. 7 shows the state that the image picked up by the image sensor 40 is displayed on the LCD display panel 11c of the mobile phone. This mode is executed when a predetermined operation is executed in the mobile phone. In this mode, the cursor keys 30 on the keyboard 11b are used to issue rotation-angle increase/decrease commands in upward/downward/leftward/rightward directions of the image sensor 40. The image sensor 40 is rotated by a predetermined angle in the direction, which corresponds to the concerned key, every time when each of the cursor keys 30 is pushed once. In other words, the screen is shifted by a predetermined distance in the direction that corresponds to the concerned key. In this mode, a button 31 positioned in the center of the cursor keys functions as a shutter button. The image data that is being displayed when the shutter button 31 is pushed (in the case of the moving picture, the image data that is obtained by converting the moving picture into the still picture when the shutter button is pushed) is stored in a predetermined area of the RAM 13 by operating this shutter button 31.

Particular operations of the mobile phone and the vehicle remote-control system will be explained with reference to FIG. 8 and subsequent drawings hereunder.

Figure 8:
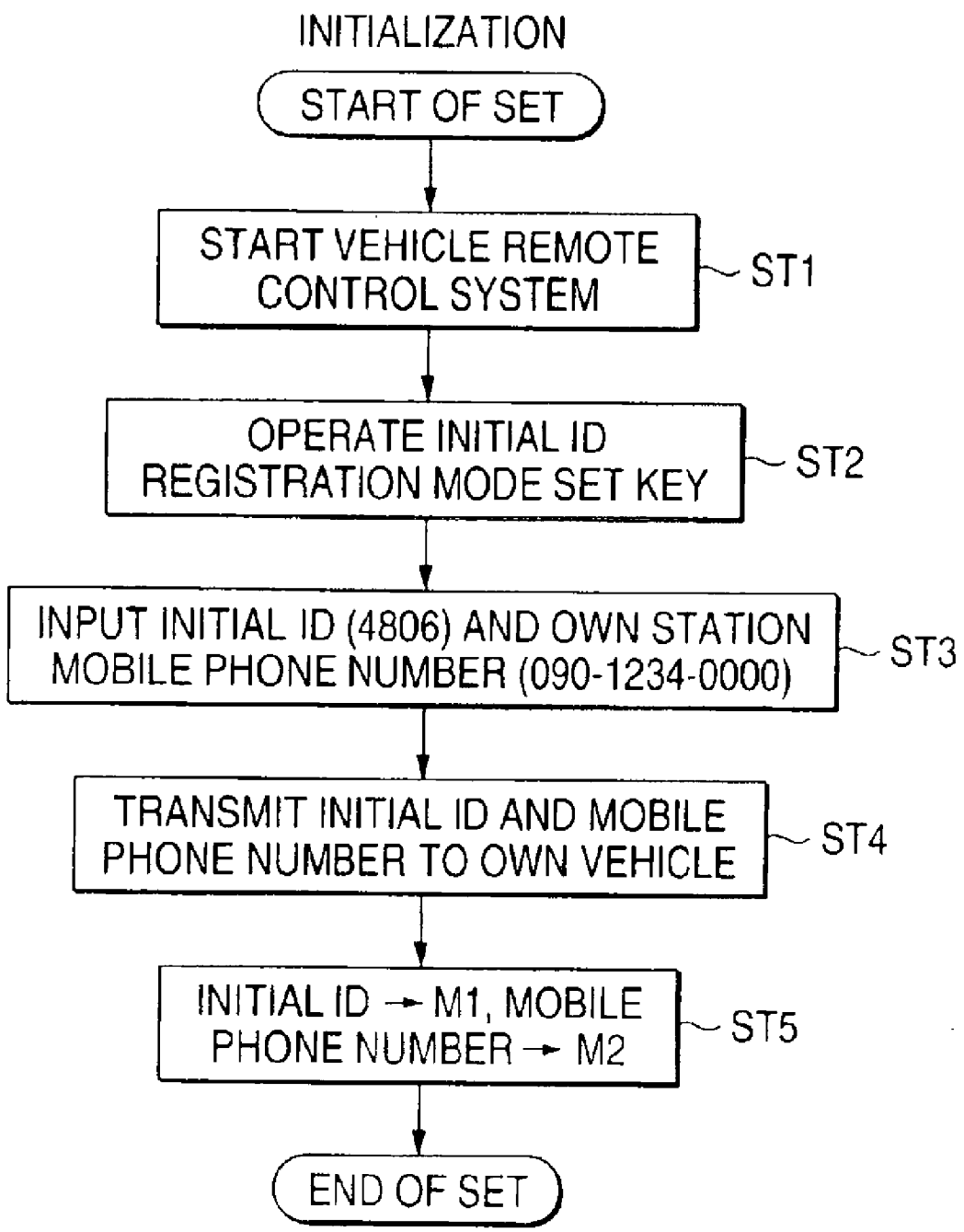
FIG. 8 is a flowchart showing an initializing operation of the vehicle remote control system.

FIG. 8 shows an initializing operation of the vehicle remote-control system by the mobile phone. The initializing operation is an operation of setting/registering the ID to the vehicle remote-control system side to make it possible for the vehicle remote-control system to authenticate the ID of the mobile phone.

Figure 9:
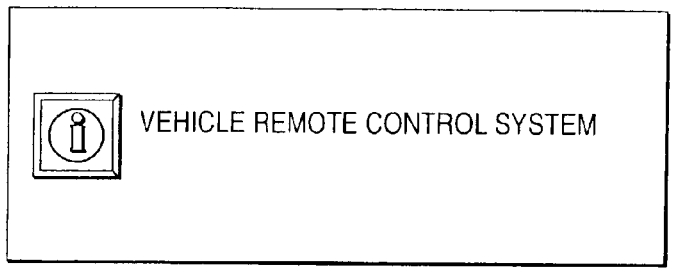
FIGS. 9A to 9D are sequential views of a display screen of the mobile phone when the vehicle remote control system is started.
Figure 9:
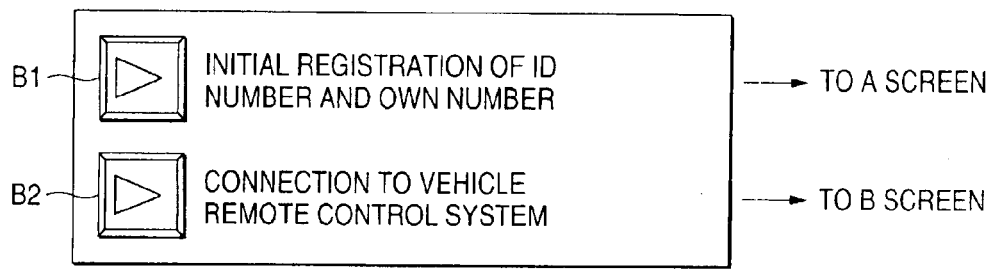
Figure 9:
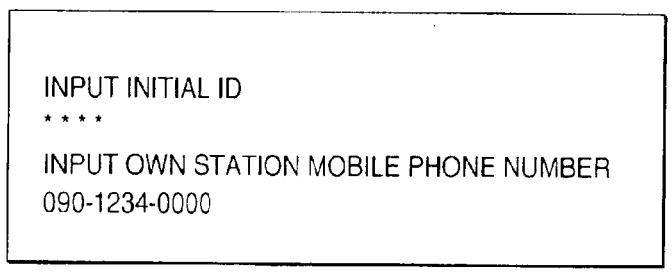
Figure 9:
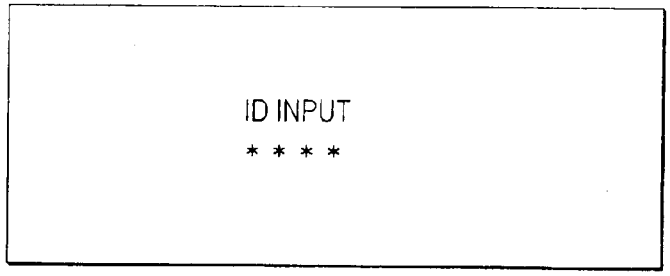

When an application program (car remote control system) of the vehicle remote control system is started by the mobile phone, a display screen in FIG. 9A appears and then a display screen in FIG. 9B appears. At this time, in ST1, the user of the mobile phone makes a call to the vehicle phone of own vehicle. As shown in FIG. 2, the phone number of own vehicle is stored in the phone number column of the vehicle remote-control system in M22. Then, a button B1 is clicked in the display state in FIG. 9B. Then, the screen is shifted to an A screen in FIG. 9C, and thus a mode in which the initial ID and own station mobile phone number are input is set. In other words, an initial ID inputting mode is set in ST2, and then the initial ID and the mobile phone number of own station are input in ST3. In this example, the initial ID is 4806 and the mobile phone number of own vehicle is 090-1234-0000. Then, the initial ID and the mobile phone number are transmitted to own vehicle (ST4). In the vehicle remote-control system of own vehicle, the transmitted initial ID is registered in the M1 and the mobile phone number is registered in the M2 (ST5). With the above processes, the initializing operation is ended.

In this case, it is desired that, before the initial ID is registered, it should be checked in the initializing operation by any approach whether or not the owner of the mobile phone is the valid person.

Figure 10:
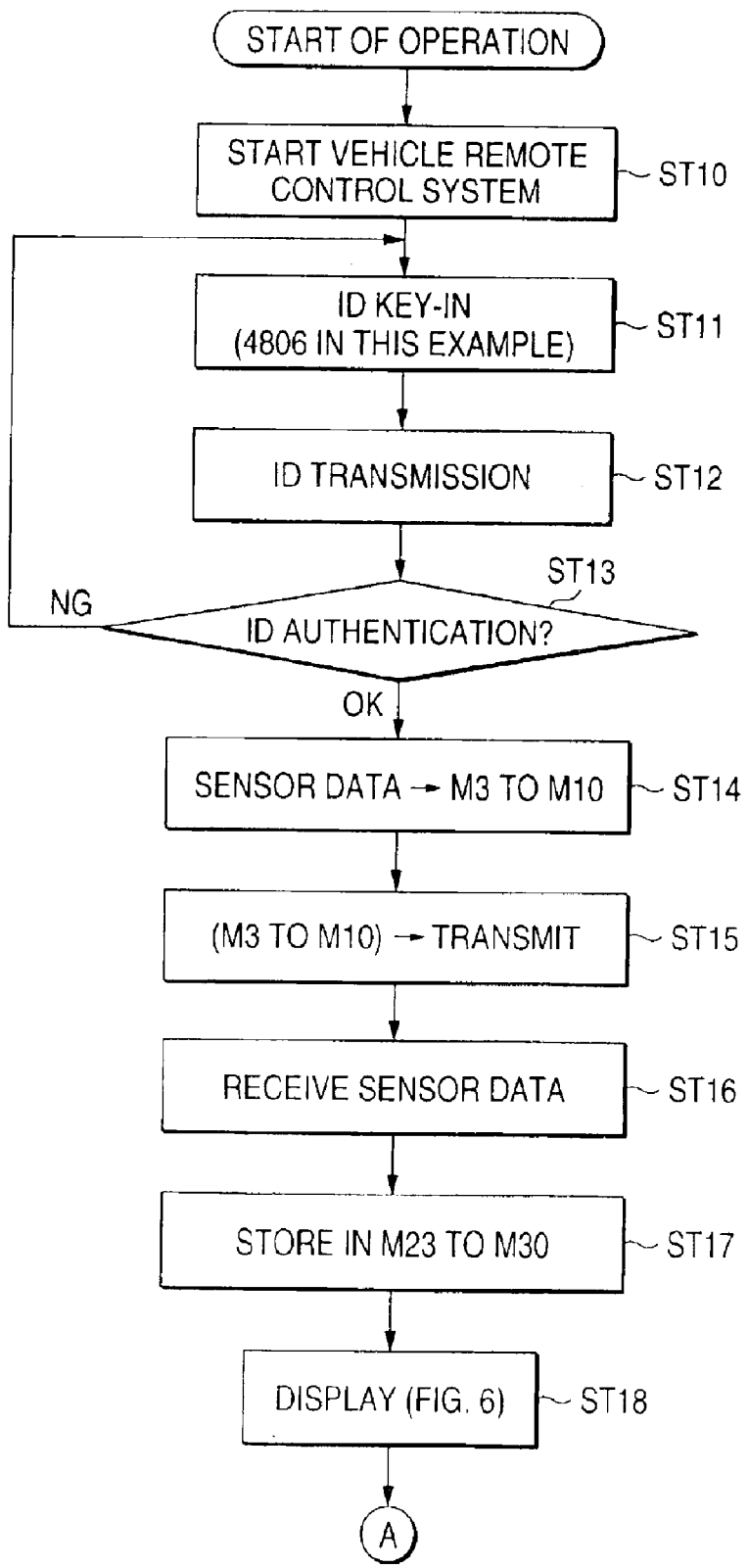
FIG. 10 is a flowchart showing an operation of the vehicle remote control system.

FIG. 10 is a flowchart showing an overall operation of the system when the vehicle remote control system is started after the initial ID is set.

At first, in ST10, the vehicle remote control system is started on the LCD display panel 11c of the mobile phone. According to the start of the system, the mobile phone communication module 11a of the mobile phone calls automatically the vehicle remote-control system and makes a connection thereto. At this time, the screen of the LCD display panel 11c is shifted to the display condition in FIG. 9B. When a button B2 is clicked at this stage, the screen is shifted to an ID input screen in FIG. 9D. Then, the operator inputs the ID onto the display screen (ST11). Then, the mobile phone communication module 11a transmits the input ID to the vehicle remote-control system (ST12). Then, in the vehicle remote-control system, the ID authentication is executed to check whether or not the received ID coincides with the ID stored in M1 (ST13). If the ID authentication is OK, the sensor data at that time are stored in M3 to M10 (ST14). Then, the sensor data stored in M3 to M10 are transmitted to the mobile phone via the mobile phone communication module 2 (ST15). Then, the mobile phone receives the sensor data (ST16), and then stores the data in M23 to M30 (ST17). Then, as shown in FIG. 6, the states of the sensors are displayed on the LCD display panel 11c of the mobile phone (ST18).

Figure 11:
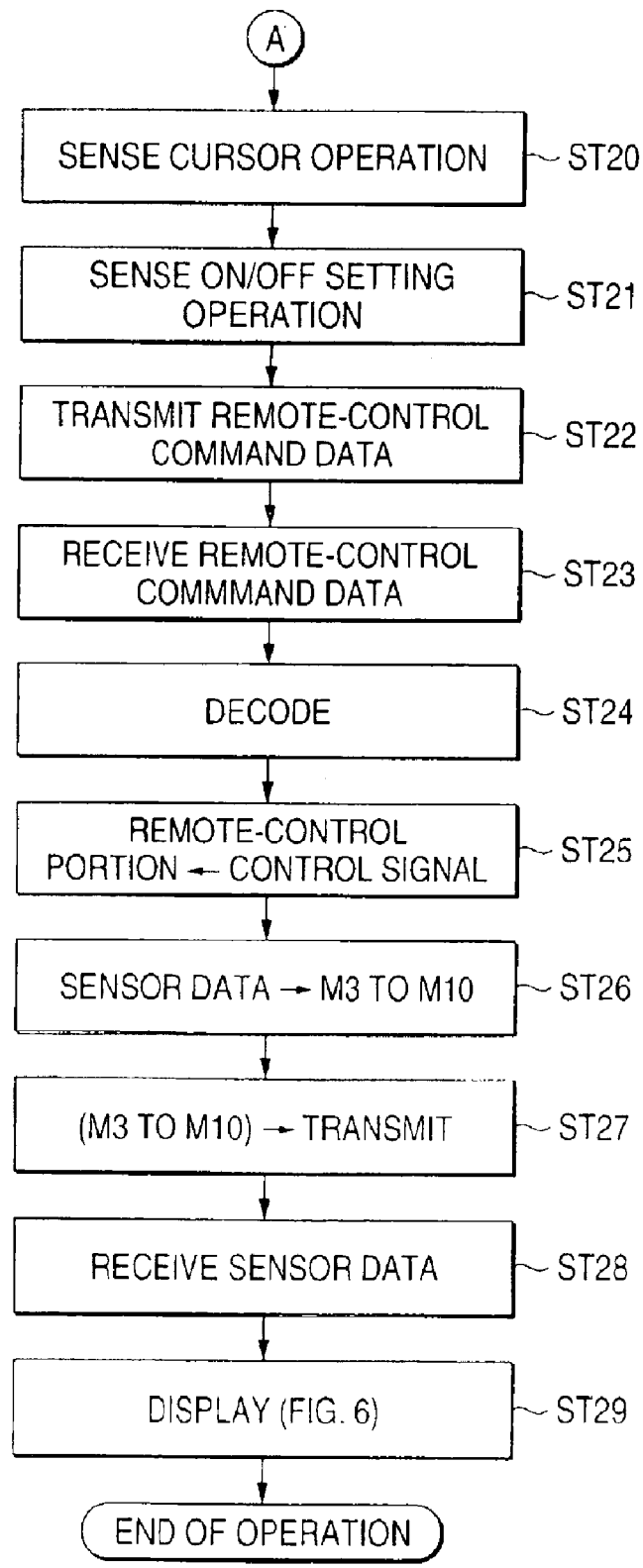
FIG. 11 is a flowchart showing an operation of the vehicle remote control system.

In addition, in FIG. 11, the user's operation made by the cursor keys 30 is sensed (ST20). The set operation made by the ON/OFF setting button 31 is sensed (ST21). Respective sensors are provided to correspond to the controlled objects. Thus, the sensor, i.e., the controlled object corresponding to the sensor position can be selected by operating the cursor keys 30. The selected controlled object is highlight-displayed. For example, in FIG. 6, the door lock is selected as the controlled object. The ON/OFF setting button 31 is used to set the ON/OFF-state of the selected controlled object. The ON/OFF setting button 31 sets ON/OFF of the selected controlled object by its toggle operation, and sets ON and OFF alternatively.

Then, the remote-control command data of the controlled object, which is set to ON or OFF by the ON/OFF setting button 31, is transmitted to the vehicle remote-control system (ST22). Then, the vehicle remote-control system receives the remote-control command data (ST23). Then, the data is decoded by the remote-control command decoder (ST24). The control signal is generated and output to the remote-control portion 3 (ST25). Thus, the remote-control portion 3 sets the concerned controlled object to its ON or OFF state. Then, the sensor portion 5 sets the sensor data in M3 to M10 (ST26). Then, the sensor data stored in M3 to M10 are transmitted to the mobile phone (ST27). Then, the mobile phone receives the sensor data (ST28). Then, the display shown in FIG. 6 appears again on the LCD display panel 11c (ST29).

With the above, first the user checks states of respective controlled objects of own vehicle on the LCD display panel 11c of the mobile phone based on the sensor data, and then sets the state of the desired controlled object into its ON or OFF state by using the cursor keys 30 and the ON/OFF setting button 31. Then, when the control operation is applied to the controlled object on the vehicle side, the updated sensor data is displayed again on the LCD display panel 11c. As a result, the user can execute the remote control of the controlled objects in own vehicle by using the mobile phone.

Other Embodiment 1

Figure 12:
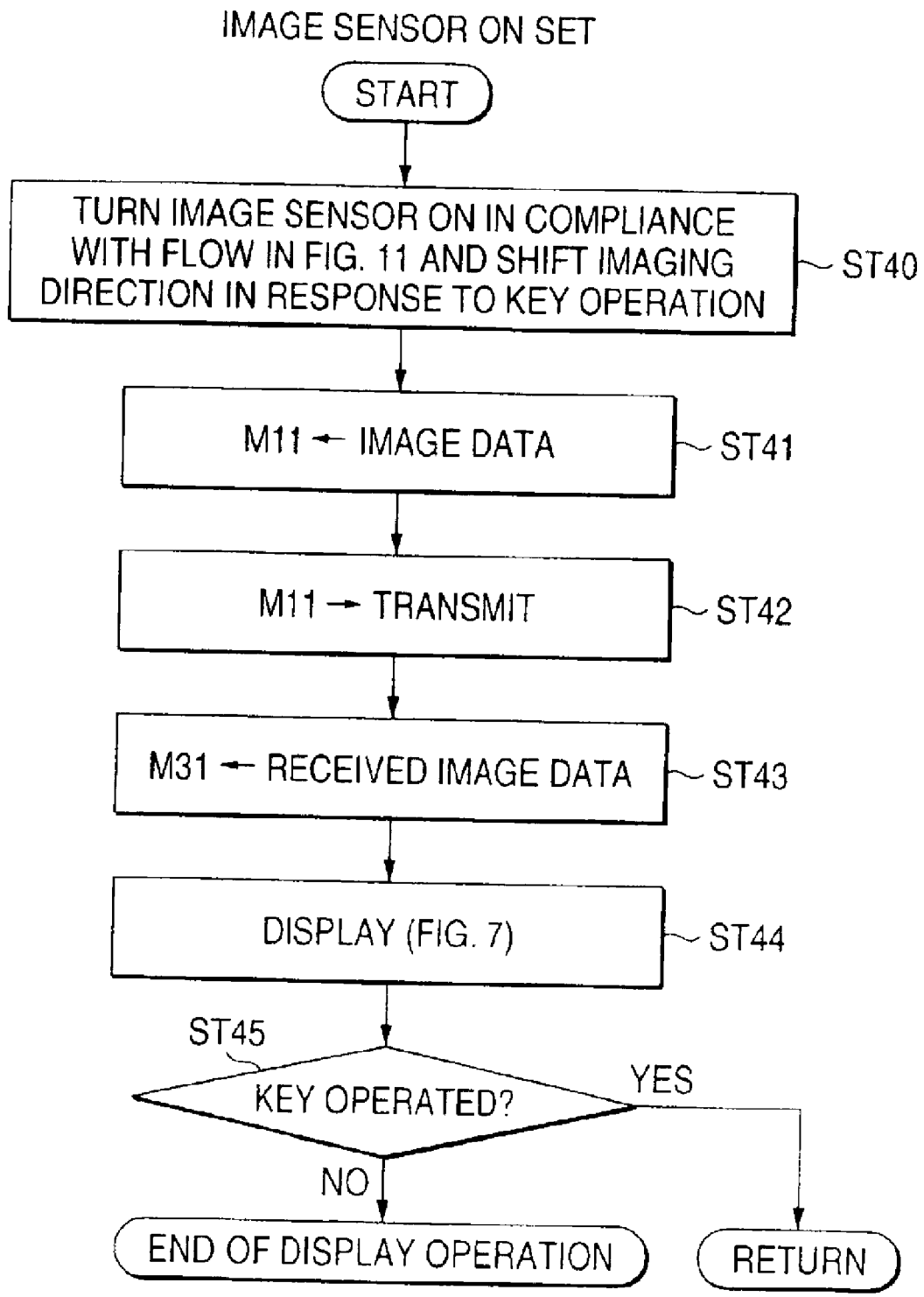
FIG. 12 is a flowchart showing an operation of the vehicle remote control system.

In this other embodiment of the present invention, a vehicle navigation system is provided to the vehicle remote-control system. The current location data (latitude, longitude data) of own vehicle, which are acquired by the vehicle navigation system, as well as the surrounding image, which is picked up by the image sensor, are transmitted to the mobile phone, and then the current location of own vehicle as well as the peripheral map is displayed in the mobile phone, and also the image that is picked up by the image sensor 40 at this time is displayed by the screen switching operation. Since an electronic compass is provided to the vehicle remote-control system, the direction along which the vehicle is now directed (own vehicle azimuth angle) is also transmitted to the mobile phone, and thus the display direction of own vehicle to be displayed is set. In this case, a location information center is provided separately to get the peripheral map, and a GPS function is installed into the mobile phone. In the location information center, the peripheral map data containing the current location of own vehicle and the current location of the mobile phone is prepared based on the current location data of own vehicle and the current location data of the mobile phone, and then this data is transmitted to the mobile phone. In this case, when the image sensor is selected in above ST20 and then this image sensor is set to its ON-state by the ON/OFF setting button 31, an operation shown in FIG. 12 is carried out. More particularly, the image sensor 40 is turned ON and the movement control of the imaging direction is executed in response to the operation of the cursor key (ST40). Thus, the image data being picked up by the image sensor 40 is stored in M11 of the vehicle remote-control system (ST41). Then, this data in M11 is transmitted to the mobile phone (ST42). The received image data is stored in M31 of the mobile phone (ST43). This image data is displayed as shown in FIG. 7 (ST44) Then, if the screen is shifted by the operation of the cursor key in the display state in FIG. 7 (ST45), the process goes back to ST40 and similar operations are executed subsequently.

Figure 13:
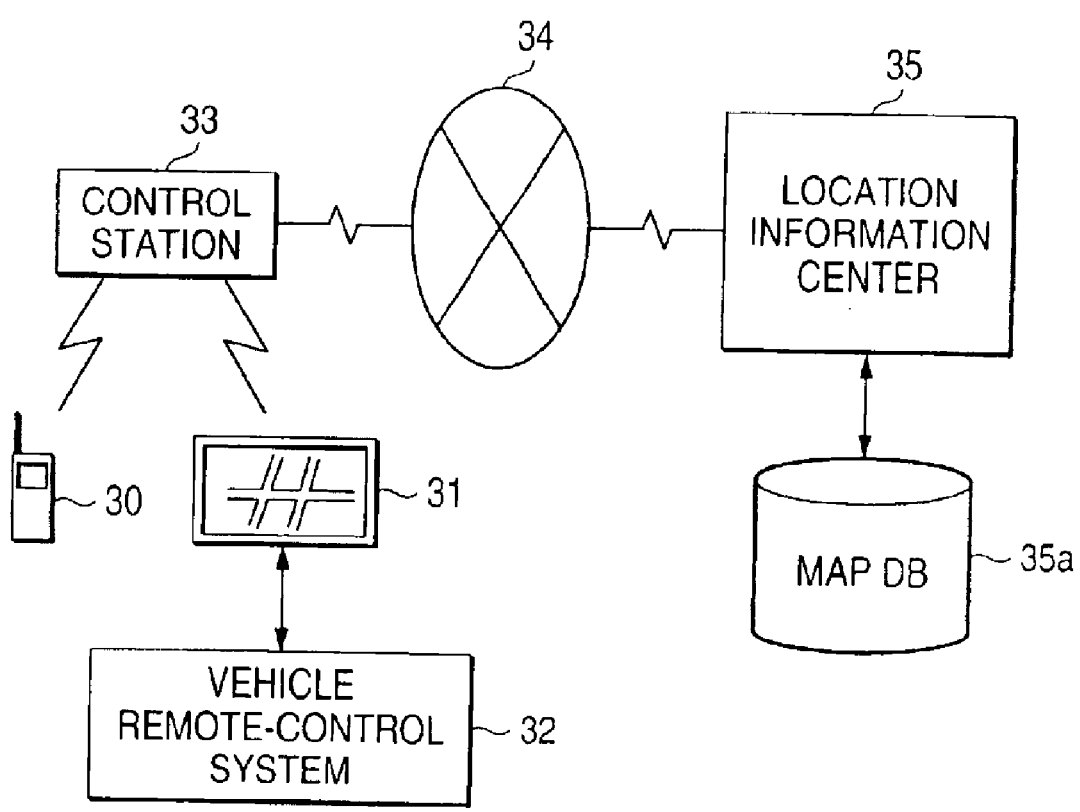
FIG. 13 is a configurative view of a system of another embodiment of the present invention.

FIG. 13 is a configurative view of the system according to the embodiment of the present invention. A vehicle navigation system 31 and a vehicle remote-control system 32 are provided to the vehicle, and a line control station 33 is connected to a location information center 35 via the Internet 34. The location information center 35 has a map data base 35a. In the present embodiment, the GPS system is built in the mobile phone 30, and thus the mobile phone by itself can perform the azimuth angle measurement.

According to the above configuration, if the mobile phone 30 selects a peripheral map display mode of own vehicle, not only the peripheral map containing own location and the location of own vehicle can be displayed on the LCD display panel of the mobile phone 30 but also the surrounding image of own vehicle can be displayed by switching the display.

Figure 14:
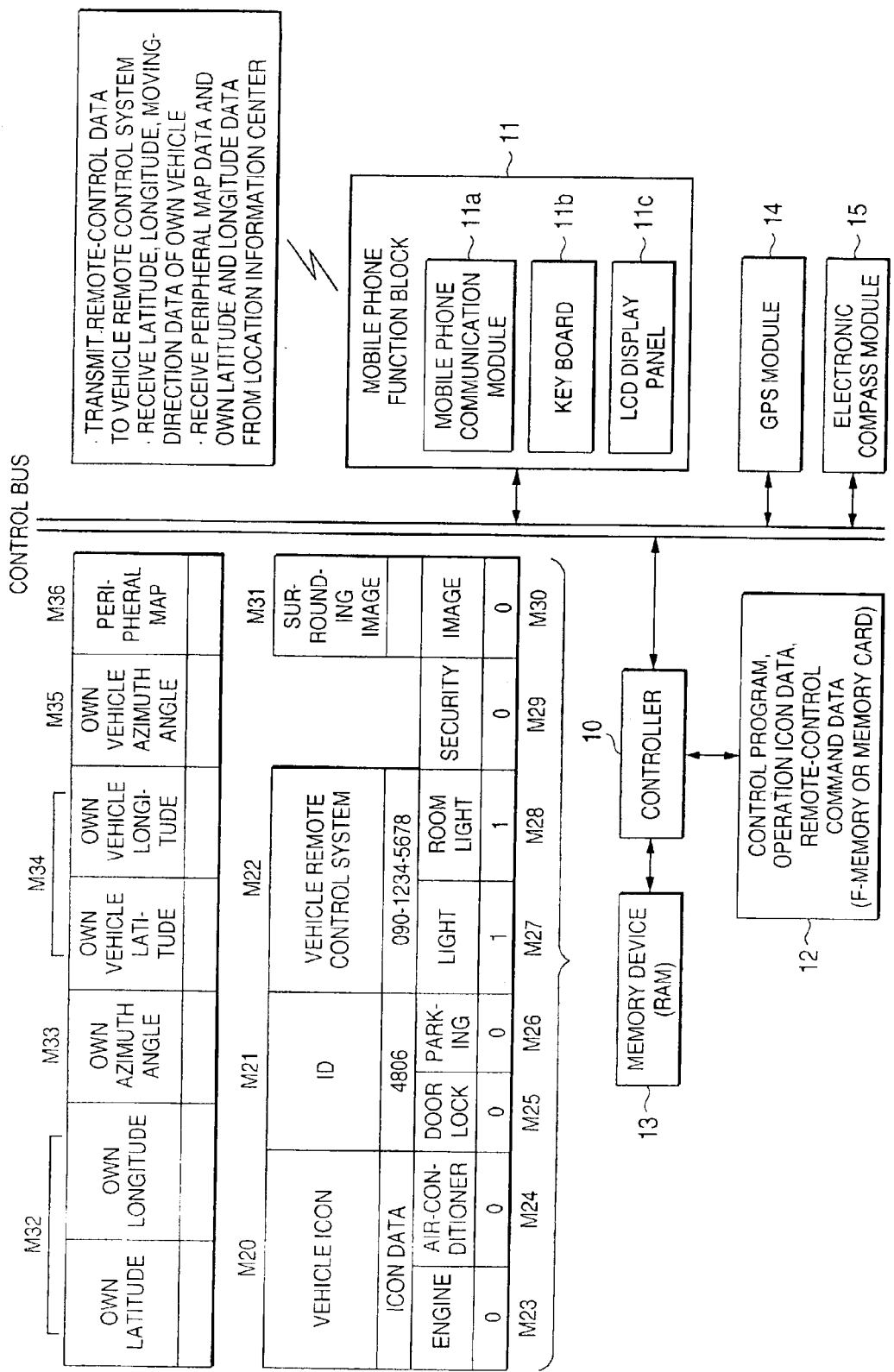
FIG. 14 is a configurative view of the mobile phone.

FIG. 14 is a configurative view of the mobile phone employed in this embodiment. A difference from the configuration shown in FIG. 2 resides in that a GPS module 14 and an electronic compass module 15 are provided and areas M32 to M36 are newly set in the RAM 13. The GPS module 14 by itself can perform the azimuth angle measurement, and transfers latitude and longitude data (current location data) to a controller 10. The electronic compass module 15 measures an azimuth to which the mobile phone is directed, i.e., an azimuth along which the owner (user) of the mobile phone walks, and then outputs this azimuth to the controller 10 as azimuth angle data. Own latitude data and own longitude data being measured by the GPS module 14 are stored in M32 of the RAM 13, and own azimuth angle data being measured by the electronic compass module 15 is stored in M33. Also, own vehicle latitude data and own vehicle longitude data being measured by the vehicle navigation system of own vehicle are stored in M34, and also own vehicle azimuth angle data being measured by the electronic compass module 15 that is provided to the vehicle remote-control system is stored in M35. The peripheral map data that is received from the location information center 35 is stored in M36.

Figure 15:
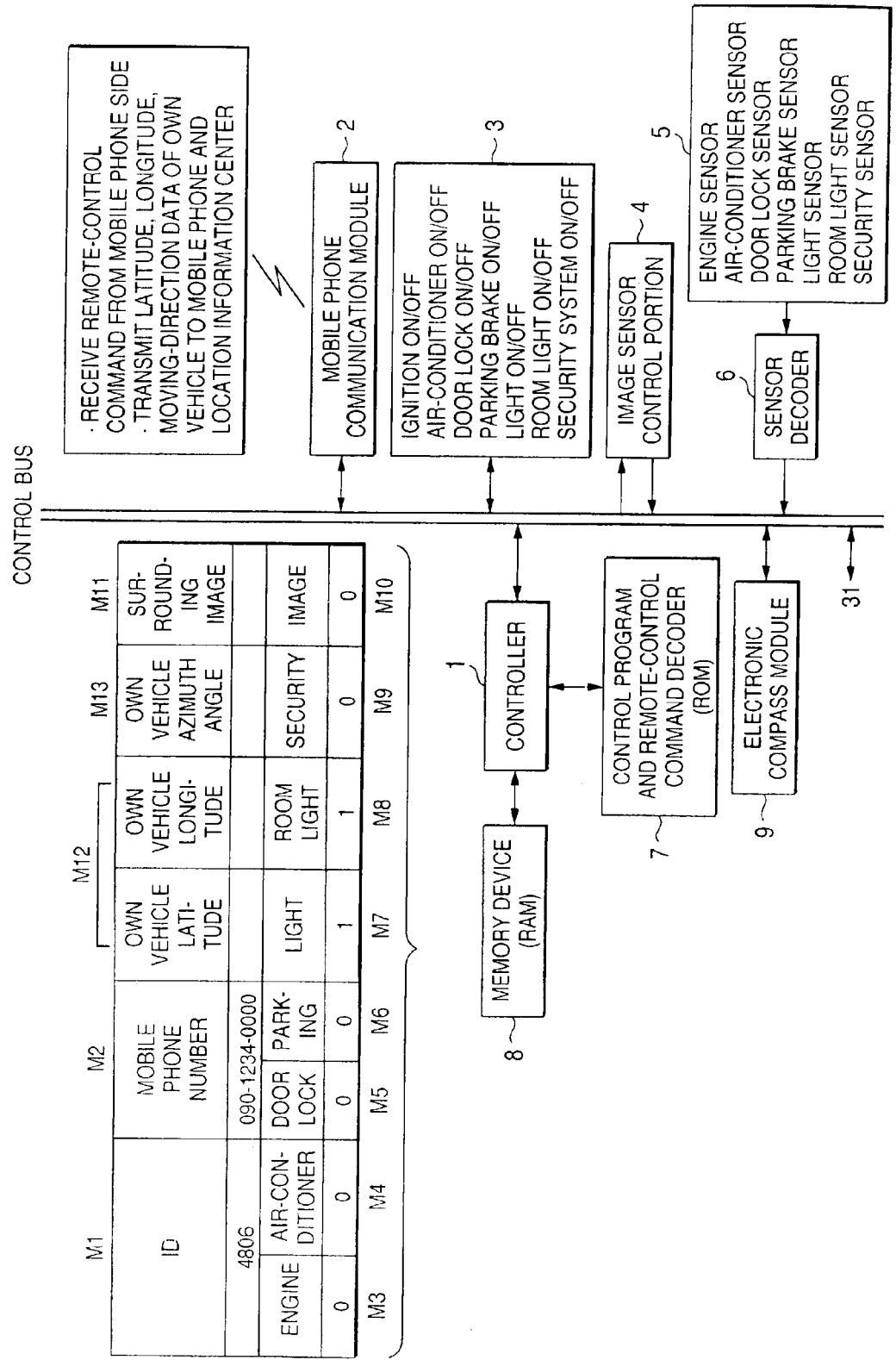
FIG. 15 is a configurative view of the vehicle remote-control system.

FIG. 15 is a configurative view of the vehicle remote-control system. A difference from the vehicle remote-control system shown in FIG. 15 is that an electronic compass module 9 is provided thereto, areas M12 to M13 are newly provided in the RAM 8, and a vehicle navigation system 31 is connected to the control bus. Own vehicle latitude data and own vehicle longitude data measured by the vehicle navigation system 31 are stored in M12, and own vehicle azimuth angle being measured by the electronic compass module 9 is stored in M13.

Figure 16:
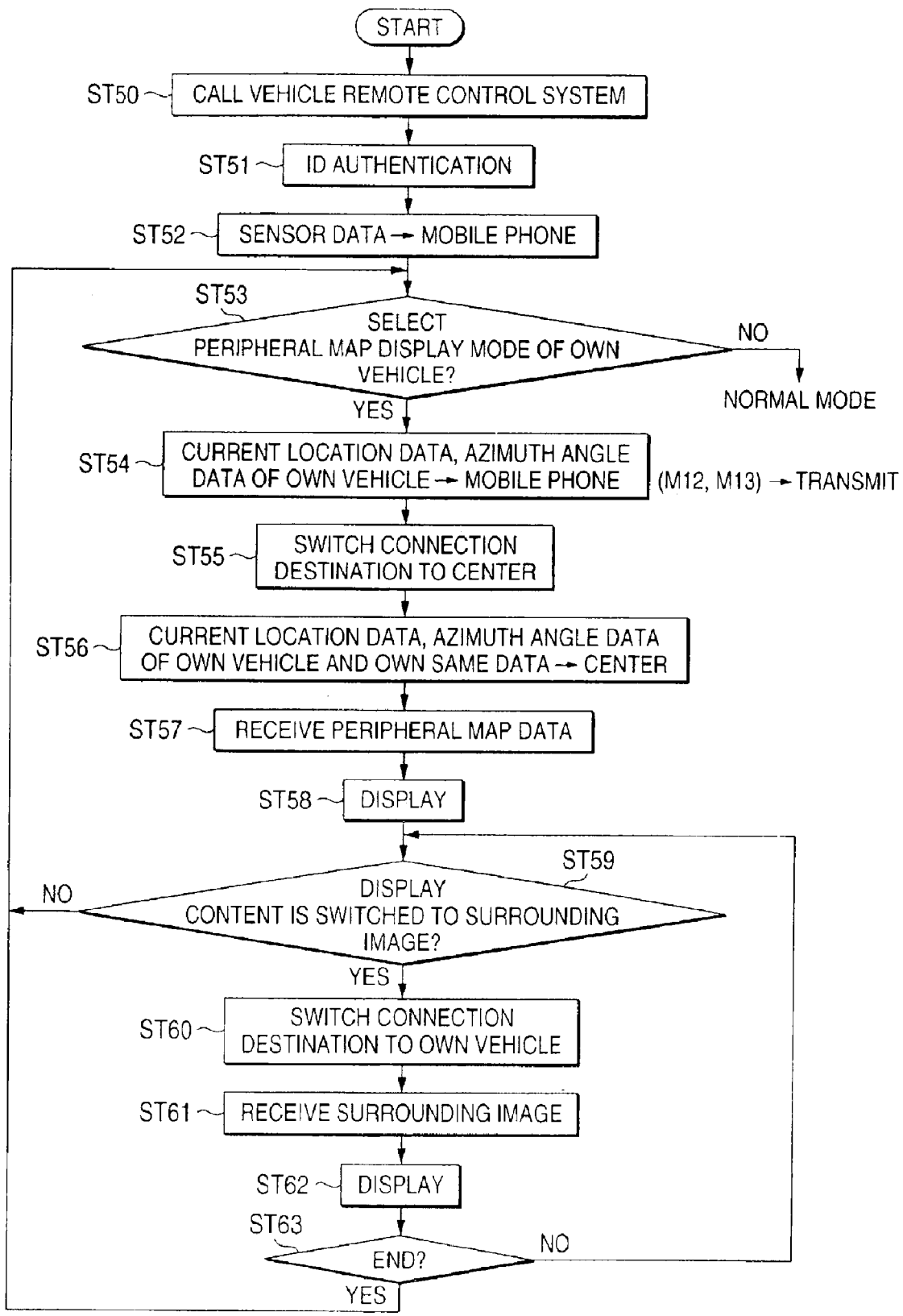
FIG. 16 is a flowchart showing an overall operation of the same system.

Next, an operation of the vehicle remote control system in the present embodiment will be explained with reference to FIG. 16 hereunder.

At first, the mobile phone 30 starts the vehicle remote control system on the display screen in FIG. 9A. When this vehicle remote control system is started, the vehicle remote-control system 32 is automatically called (ST50). Then, the ID authentication is executed (ST51) Then, the sensor data is transmitted to the mobile phone 30 from the vehicle remote-control system 32, and then the display shown in FIG. 6 appears on the LCD display panel of the mobile phone (ST52). At this time, unless the peripheral map display mode of own vehicle is selected by the predetermined key operation of the mobile phone, such mobile phone is set to the normal mode and then the operation shown in FIG. 11 is executed. Then, if the peripheral map display mode of own vehicle is selected (ST53), processes in ST54 and subsequent steps are executed.

Figure 17:
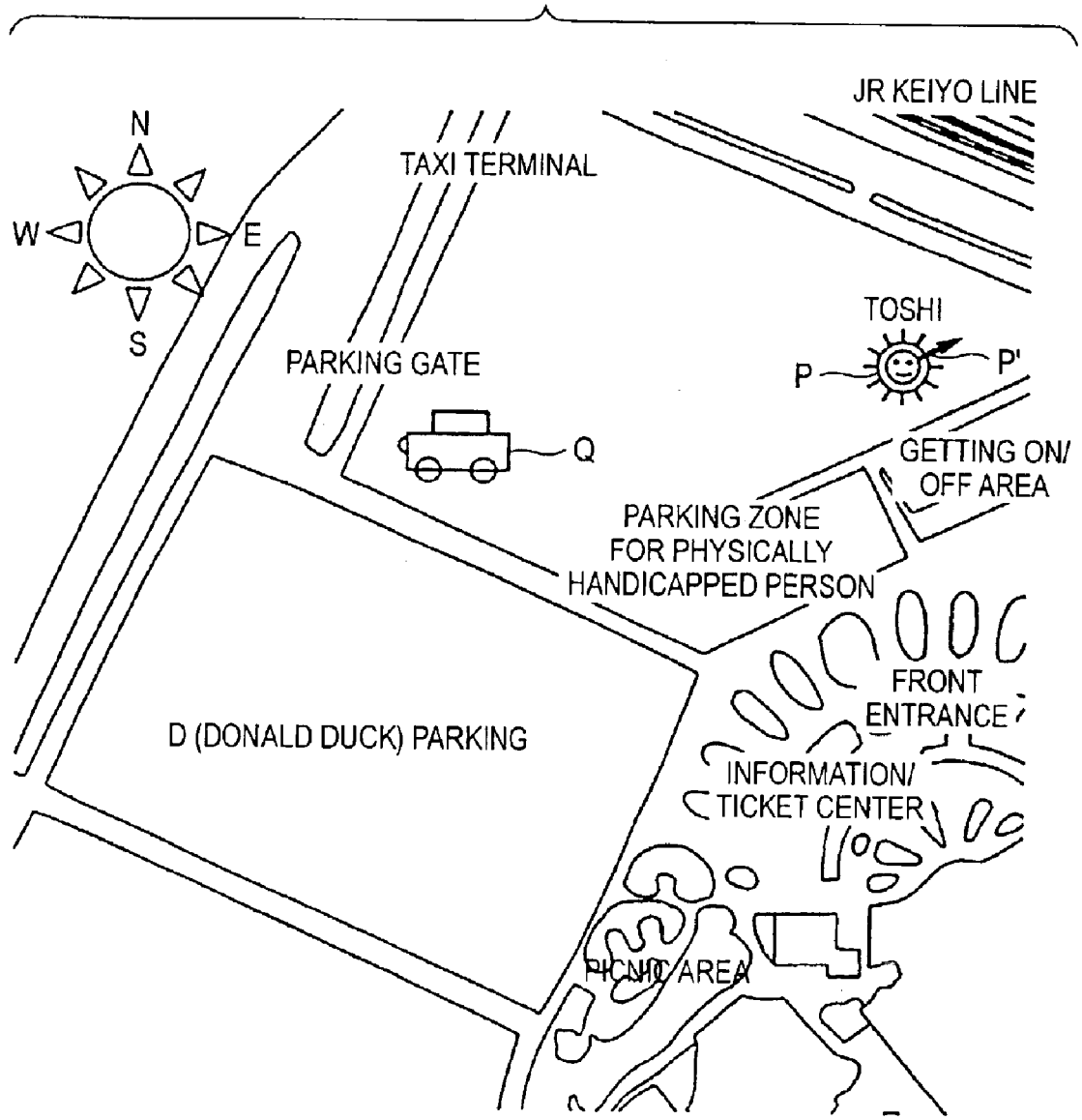
FIG. 17 is a view showing an example of display in the mobile phone.

In the peripheral map display mode of own vehicle, at first current location data (latitude data, longitude data) of own vehicle and the azimuth angle data of own vehicle are transmitted to the mobile phone (ST54). That is, the data stored in M12, M13 are transmitted to the mobile phone. Then, the connection destination of the mobile phone is switched automatically from the vehicle remote-control system 32 to the location information center 35 (ST55). Then, the mobile phone 30 transmits the current location data of own vehicle and the azimuth angle data of own vehicle, which are received in above ST54, and own current location data and own azimuth angle data, which are measure by the GPS module 14 and the electronic compass module 15 respectively, to the location information center 35 (ST56). Such location information center 35, when received these data, prepares the peripheral map data, in which the locations of own vehicle and the user are contained, based on the map data base 35a, and then transmits such map data to the mobile phone 30. Then, the mobile phone 30 receives the peripheral map data (ST57). Then, such data is displayed on the LCD display panel (ST58). FIG. 17 shows an example of the display. In FIG. 17, Q denotes an icon of own vehicle, and P denotes own icon. In this manner, the location information center 35 prepares the peripheral map data having a reduced scale rate, at which own vehicle location and the location of the user can be seen simultaneously without the scroll of the screen, and then transmits such data to the mobile phone 30. For this reason, the user can grasp not only the location of own vehicle but also the relationship between the locations of own vehicle and the user by snatching a glance at this peripheral map data. In this case, in the displaying operation, an angle to which the icon Q of own vehicle is directed is decided based on the azimuth angle data of own vehicle, and the direction of an arrow P' that is displayed to overlap with own icon P is decided based on own azimuth angle data.

Then, it is decided whether or not the current display content should be switched to the surrounding image (ST59). In this decision, it is decided whether or not a particular key of the mobile phone is operated. Then, the process goes to ST60 if the particular key is operated, and the process goes back to ST53 if the particular key is not operated. In ST60, the connection destination is switched from the location information center 35 to the vehicle remote-control system 32 (ST60). Then, the surrounding image is received from the vehicle remote-control system 32 (ST61). That is, the surrounding image stored in M11 is received. Then, the surrounding image is displayed on the LCD display panel 11c (FIG. 7) (ST62). Then, the process goes back to ST59 unless the display mode is ended by the particular key, while the process goes back to ST53 if the display mode is ended (ST63).

In this case, the mobile phone 30 may transmit the GPS data being measured by the GPS module 14 to the location information center 35 as it is, and then the azimuth angle measurement of the mobile phone 30 may be executed in the location information center 35 based on the GPS data. In this case, the azimuth angle measurement can be executed according to the D-GPS system, which employs the location information center 35 as the base station, and thus the azimuth angle measurement of the mobile phone 30 can be executed with high precision. Also, at least the vehicle navigation system may be connected to the vehicle remote-control system, and the electronic compass module 9 is not always needed. If this module is not provided, merely the azimuth of own vehicle is not displayed in the mobile phone.

Other Embodiment 2

Figure 18:
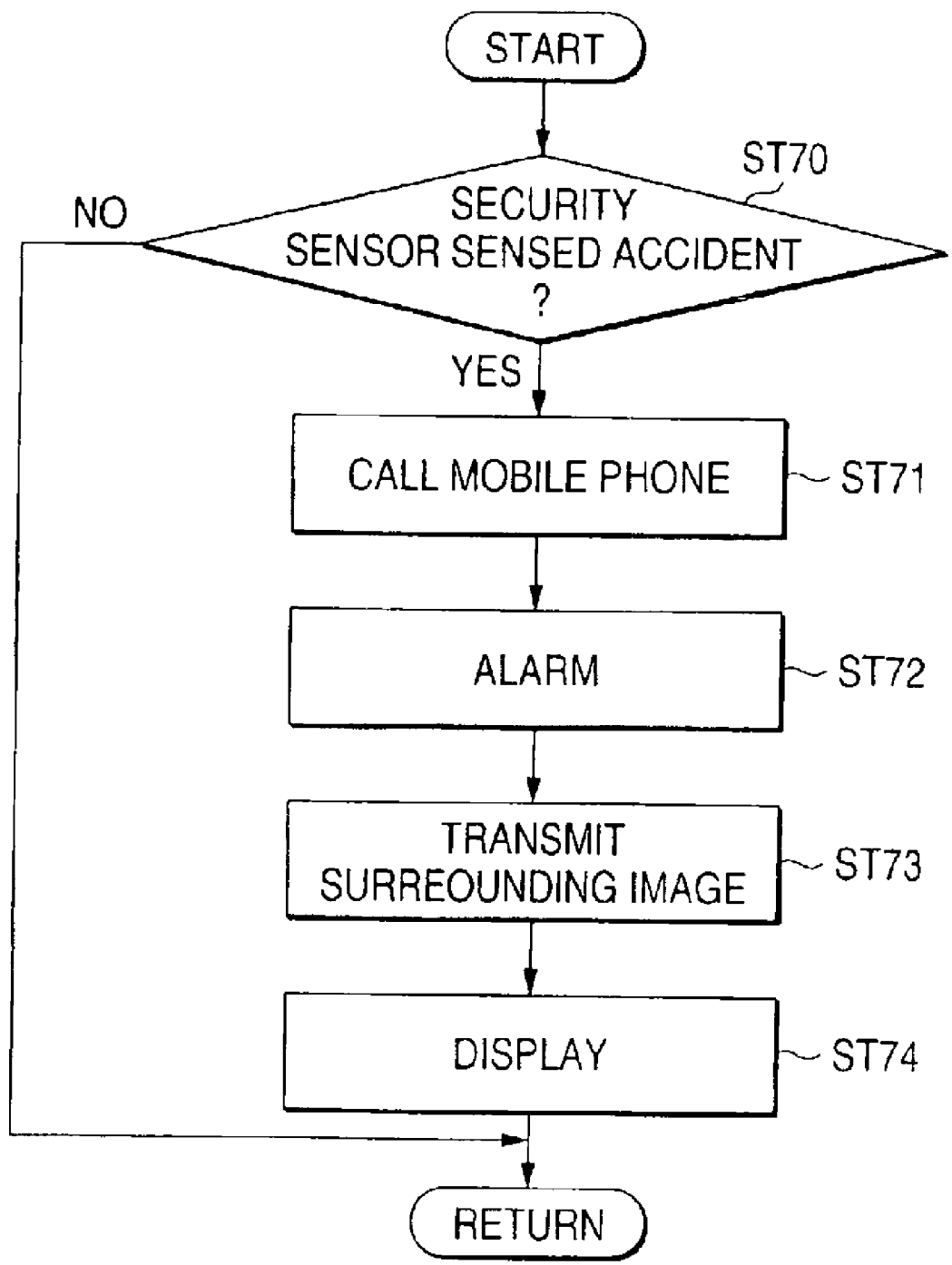
FIG. 18 is a flowchart showing an overall operation of still another embodiment of the present invention.

In the above embodiments, the remote-control or the display of the surrounding image, etc. may be executed at a remote place by calling the vehicle remote-control system 32 from the mobile phone 30. However, when the abnormal condition is caused, the surrounding image maybe transmitted to the mobile phone from the vehicle remote-control system side by calling automatically the mobile phone in response to the security sensor that senses the theft of own vehicle. In other words, as shown in FIG. 18, if the security sensor sensed an accident in the vehicle remote-control system 32 (ST70). Then, the mobile phone is called automatically (ST71). Then, the alarm is issued on the mobile phone side (ST72). Also, the surrounding image being picked up by the image sensor 40 (see FIG. 3) is transmitted to the mobile phone (ST73) Then, this image is displayed on the LCD display panel 11c (ST74).

Other Embodiment 3

In the above embodiments, the remote control may be executed at a remote place by calling the vehicle remote-control system from the mobile phone. But merely the display shown in FIG. 6 may be given by transmitting the sensor data to the mobile phone. Unless the remote control from the remote place is executed, the maintenance condition and the trouble condition of own vehicle can be confirmed by displaying the condition of own vehicle on the mobile phone. In this case, the sensor portion may be constructed by various sensors containing a gasoline sensor, an oil sensor, a battery sensor, etc., which sense various conditions in the vehicle. According to the above configuration, because sensed information of respective sensors are transmitted to the mobile phone and displayed thereon, the maintenance condition, etc. of own vehicle can be checked at the remote place.

Also, ST73 and ST74 may be omitted from FIG. 18. In this case, if the mobile phone is called in ST71 to cause the mobile phone side to issue the alarm therefrom, the owner of the mobile phone can distinguish such alarm differently from the normal phone call, and therefore such owner can respond to such alarm at once.

According to the present invention, since the mobile phone is utilized, the condition of the vehicle can be checked at the remote location that is away from own vehicle, and also the controlled objects can be set into the desired states by the remote operation even if the user forgot the light OFF, the door lock, etc. at the time of parking. In addition, since the ID authentication is required as the condition to execute this remote operation, the security is increased and this system is excellent in the theft prevention.

Also, since the abnormality is informed of the mobile phone when the security sensor informs the accident and also several images being picked up by the image sensor are automatically transmitted, the theft can be suppressed. Also, since the surrounding image is automatically transmitted, the user can take quickly the countermeasure even when the vehicle is stolen.

What is claimed is:

1. A vehicle control system comprising:
    a communication module which communicates with a mobile phone in response to a call issued from the mobile phone;
    an image sensor control portion which includes an image sensor for capturing a peripheral image of the vehicle and detects image information captured by the image sensor, wherein a capturing direction of the image sensor is controlled by a first command received through the communication module based on an operation of an operating device provided at the mobile phone;
    an electric compass that determines azimuth angle data showing the direction along which the vehicle is directed;
    a storage that obtains positional data showing a current position of the vehicle from a vehicle navigation system that is connected to the vehicle control system, measures the current position of the vehicle, and stores the positional data and the azimuth angle data detected by the electronic compass; and
    a controller which controls the communication module to transmit the positional data and the azimuth angle data that are stored in the storage through the communication module to the mobile phone according to a second command received through the communication module from the mobile phone,
    wherein, the controller controls the communication module to transmit the image information detected by the image sensor control portion through the communication module to the mobile phone according to a third command received through the communication module from the mobile phone.

2. The vehicle control system according to claim 1, wherein the second command from the mobile phone is a command for instructing to display a periphery map on a display of the mobile phone.

3. The vehicle control system according to claim 1, wherein the third command from the mobile phone is a command for instructing to switch a screen showing a peripheral map on a display of the mobile phone to a screen showing the peripheral image.

4. The vehicle control system according to claim 1, including a security sensor for detecting an abnormal state of the vehicle,
    wherein the controller automatically transmits, to the mobile phone, the information representing the detected abnormal state and the peripheral image captured by the image sensor when the security sensor detects the abnormal state of the vehicle.

5. The vehicle control system according to claim 4, wherein the storage stores the image information detected by the image sensor control portion.

6. A remote-control system for vehicle including a vehicle control system and a mobile phone, the vehicle remote control system comprising:
    the vehicle control system including:
        a communication module which communicates with the mobile phone in response to a call issued from the mobile phone,
        an image portion control portion which includes an image sensor for capturing a peripheral image of the vehicle and, detects image information captured by the image sensor, wherein a capturing direction of the image sensor is controlled by a first command received through the communication module based on an operation of an operating device provided at the mobile phone;

an electric compass that determines azimuth angle data showing the direction along which the vehicle is directed;

a storage that obtains positional data showing a current position of the vehicle from a vehicle navigation system that is connected to the vehicle control system and measures the current position of the vehicle, and stores the positional data and the azimuth angle data detected by the electronic compass, and a controller which controls the communication module to transmit the positional data and the azimuth angle data that are stored in the storage through the communication module to the mobile phone according to a second command received through the communication module from the mobile phone, wherein the controller controls the communication module to transmit the image information detected by the image sensor control portion through the communication module to the mobile phone according to a third command received through the communication module from a mobile phone; and the mobile phone including:
a input portion which inputs the second or third command, and
a display portion which displays an image based on the image information detected by the image sensor control portion.

7. A method of controlling a vehicle control system which includes a communication module for communicating with a mobile phone, an image sensor control portion which includes an image sensor for capturing a peripheral image of the vehicle and detects image information captured by the image sensor in which a capturing direction of the image sensor is controlled by a first command received through the communication module based on an operation of an operating device provided at the mobile phone, an electric compass that determines azimuth angle data showing the direction along which the vehicle is directed, a storage that obtains positional data showing a current position of a vehicle from a vehicle navigation system that is connected to the vehicle control system and measures a current position of the vehicle, and stores the positional data and the azimuth angle data detected by the electric compass and a controller that controls the communication module to transmit the positional data and the azimuth angle data to the mobile phone, the method comprising the steps of:

communicating with the mobile phone when the communication module receives a call issued from the mobile phone;

transmitting the positional data and the azimuth angle data that are stored in the storage according to a second command received through the communication module from the mobile phone; and transmitting, to the mobile phone, the image information detected by the image sensor control portion through the communication module to the mobile phone according to a third command received through the communication module from the mobile phone.

* * * * *